US012675069B2

(12) United States Patent
Kita et al.

(10) Patent No.: US 12,675,069 B2
(45) Date of Patent: Jul. 7, 2026

(54) IMAGE FORMING APPARATUS PERFORMING IMAGE DENSITY CONTROL BASED ON DEVELOPER AMOUNT

(71) Applicant: CANON KABUSHIKI KAISHA, Tokyo (JP)

(72) Inventors: Hiroshi Kita, Shizuoka (JP); Akihiko Uchiyama, Shizuoka (JP); Yuichiro Hirata, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/987,889

(22) Filed: Dec. 19, 2024

(65) Prior Publication Data

US 2025/0208553 A1 Jun. 26, 2025

(30) Foreign Application Priority Data

Dec. 20, 2023 (JP) ................................ 2023-214787

(51) Int. Cl.
*G03G 15/00* (2006.01)
*G03G 15/01* (2006.01)
*G03G 21/18* (2006.01)

(52) U.S. Cl.
CPC ..... *G03G 15/5058* (2013.01); *G03G 15/0121* (2013.01); *G03G 15/0189* (2013.01); *G03G 15/556* (2013.01); *G03G 21/1814* (2013.01); *G03G 21/1889* (2013.01)

(58) Field of Classification Search
CPC ........... G03G 15/0121; G03G 15/0189; G03G 15/0896; G03G 15/5058; G03G 15/556; G03G 21/1676; G03G 21/1814; G03G 21/1842; G03G 21/1889
See application file for complete search history.

(56) References Cited

U.S. PATENT DOCUMENTS

| | | | | |
|---|---|---|---|---|
| 11,635,720 | B2 | 4/2023 | Yamamura | |
| 12,008,422 | B2 | 6/2024 | Imai | |
| 2006/0294415 | A1* | 12/2006 | Kawai | G03G 15/556 714/6.1 |
| 2024/0210846 | A1* | 6/2024 | Hasegawa | G03G 15/556 |
| 2024/0419111 | A1* | 12/2024 | Hirata | G03G 21/1814 |

FOREIGN PATENT DOCUMENTS

| | | | |
|---|---|---|---|
| JP | 2003-270901 | A | 9/2003 |
| JP | 2017-215417 | A | 12/2017 |
| JP | 2019-200307 | A | 11/2019 |
| JP | 2022-064626 | A | 4/2022 |
| JP | 2023-064921 | A | 5/2023 |

* cited by examiner

*Primary Examiner* — Sophia S Chen
(74) *Attorney, Agent, or Firm* — Venable LLP

(57) ABSTRACT

An image forming apparatus is usable with a process cartridge which includes an image bearing member; a developer bearing member which develops an electrostatic latent image with developer; an accommodating chamber which contains the developer; and a memory. The image forming apparatus includes a detector for emitting light to a patch of a developer image and detecting reflected light; and a controller for performing image density control when controlling image density to form the developer image, based on a value of image data and information on the reflected light. The memory stores information corresponding to a developer amount in the accommodating chamber, and the controller changes the patch pattern between cases where the information in the memory is information relating to a first amount and a second amount.

14 Claims, 13 Drawing Sheets

IMAGE FORMING APPARATUS PERFORMING IMAGE DENSITY CONTROL BASED ON DEVELOPER AMOUNT

BACKGROUND OF THE INVENTION

Field of the Invention

The present invention relates to an image forming apparatus.

Description of the Related Art

An inline color type image forming apparatus, which includes a plurality of photosensitive drums, i.e., image bearing members, arranged linearly in the rotating direction of an intermediate transfer member, has been known as an image forming apparatus, such as a laser beam printer. In such an image forming apparatus, a process cartridge type has been commonly used, where a process cartridge, integrating an image bearing member, developing means and a toner accommodating unit, is removably installed in the image forming apparatus main unit. Furthermore, such an image forming apparatus may be provided with a plurality of process cartridges having a plurality of service life settings. The user selects and purchases any process cartridges of which service lives are set, considering the price or the like, and installs these cartridges in the image forming apparatus. In some cases, process cartridges, of which service lives are different depending on the color, may be installed.

By performing density control (calibration) in such an image forming apparatus in accordance with the degree of use of the process cartridge, tinge can be adjusted. Japanese Patent Application Publication No. 2003-270901 discloses a process cartridge type image forming apparatus that can print colors, in which image density control is performed based on a result of detecting the density of a test image (patch), so as to suppress image density change that is generated as a number of prints increases.

Furthermore, Japanese Patent Application Publication No. 2022-064626 proposes a correction method of correcting image forming conditions, such as correction amounts of density gradation and color deviation, in accordance with the conditions of combination between unit identification information stored in a replaceable image forming unit, including a process cartridge, and installation portion identification information of a unit installation portion.

SUMMARY OF THE INVENTION

Between the process cartridges in which mutually different service lives are set, as mentioned above, the types of functional components, e.g., roller, and the toner filling amount used in each process of charging and development are different. Therefore, the tendency of image gradation characteristics and degree of change thereof before the image density control tend to be different from each other. However, in the case of the image forming apparatus having the conventional configuration mentioned above, the image density of each test image (patch) used for the image density control and the number of the test images (the number of patches) are basically determined for each color. Hence even if the type (e.g., service life) of each process cartridge is different, the abovementioned problem has not been considered.

With the foregoing in view, it is an object of the present invention to improve the accuracy of the adjustment operation for the image density control, which is performed in the image forming apparatus in which a plurality of types of process cartridges are installed.

The present invention provides an image forming apparatus to which a process cartridge is attachable,

- wherein the process cartridge is configured to include: an image bearing member of which surface is exposed based on image data to form an electrostatic latent image on the surface; a developer bearing member which develops the electrostatic latent image by developer to form a developer image; an accommodating chamber which contains the developer; and a memory,
- wherein the image forming apparatus comprises:
  - a detecting unit configured to emit light to a patch of the developer image, detect reflected light, and output information on the reflected light, and
  - a control unit configured to perform image density control on the process cartridge, to control image density when forming the developer image, based on a value of the image data and information related to the reflected light,
- wherein the memory stores information corresponding to a developer amount contained in the accommodating chamber, and
- wherein the control unit controls to change a pattern of the patch to be used for the image density control, between a case where the information in the memory is first information corresponding to a case of the developer amount being a first amount, and a case where the information is second information corresponding to a case of the developer amount being a second amount, which is different from the first amount.

According to the present invention, the accuracy of the adjustment operation for the image density control, which is performed in the image forming apparatus in which a plurality of types of process cartridges are installed, can be improved.

Further features of the present invention will become apparent from the following description of exemplary embodiments with reference to the attached drawings.

DESCRIPTION OF THE EMBODIMENTS

Figure 1:
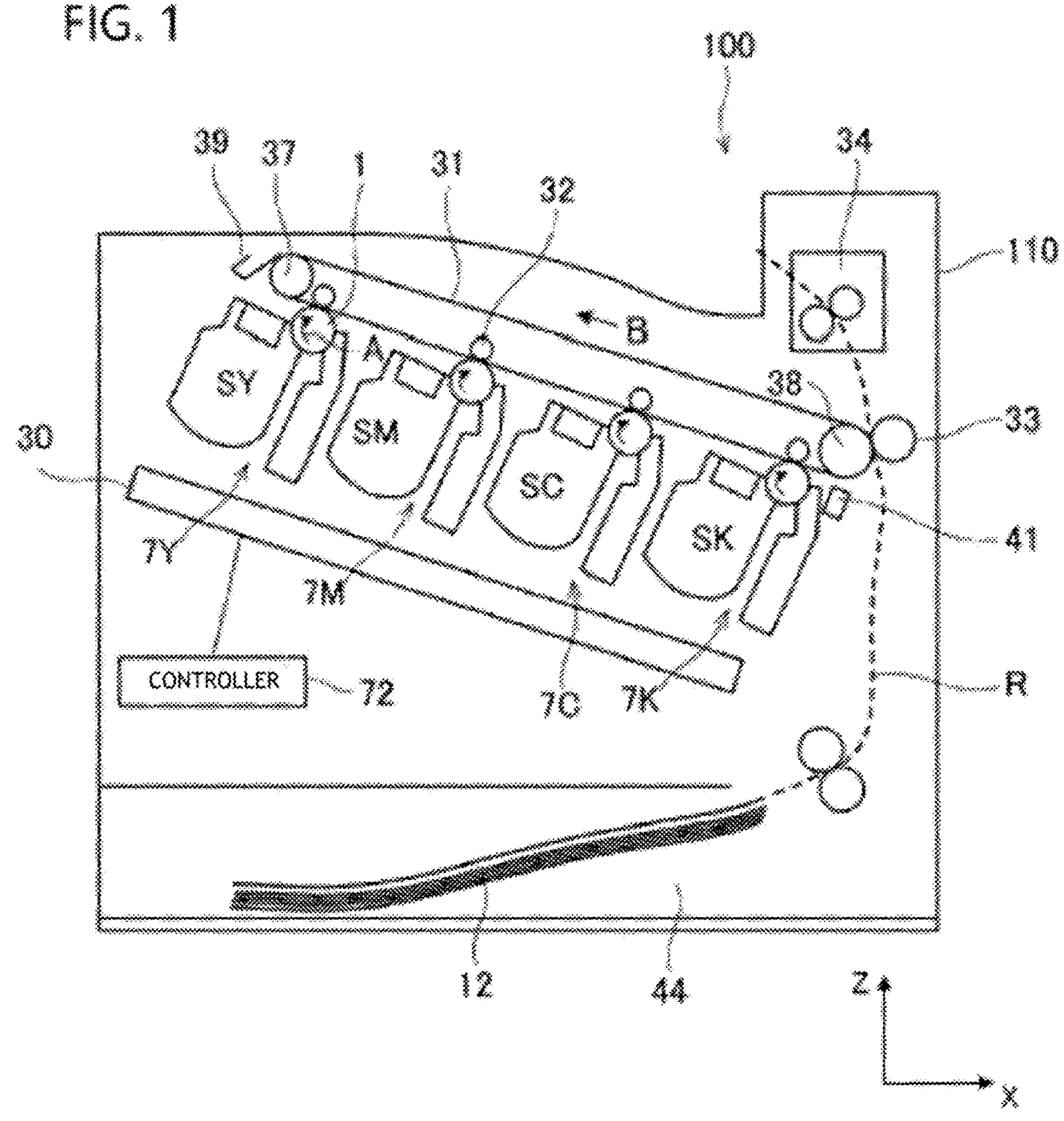
FIG. 1 is a schematic cross-sectional view depicting a configuration of an image forming apparatus according to Embodiment 1.

Preferred embodiments of the present invention will now be described in detail with reference to the drawings. Dimensions, materials, and shapes of composing elements, and relative positions thereof, which will be described in the embodiments, are not intended to limit the scope of the invention only to these descriptions unless otherwise specified. In the following description, a material, a shape and the like of a member described once are the same as first described unless otherwise specified. For configurations and steps that are not especially illustrated or described, a known technique or conventional technique in this technical field may be applied. Redundant description may be omitted.

Embodiment 1

A general configuration of an electrophotographic type image forming apparatus 100 will be described first with reference to the schematic cross-sectional views in FIGS. 1 and 2, and a control block diagram in FIG. 3. The image forming apparatus 100 of Embodiment 1 is an inline type and intermediate transfer type full color laser printer. The image forming apparatus 100 can form a full color image on a recording material 12 (e.g., recording paper) in accordance with image information. The image information is inputted to an image forming apparatus main unit 110 from a personal computer (PC 120 in FIG. 3), which is connected to be communicable with the image forming apparatus main unit 110, or a host apparatus (e.g., image reader) connected to the image forming apparatus main unit 110.

A plurality of image forming units of the image forming apparatus 100 includes: first, second, third and fourth image forming units SY, SM, SC and SK for forming an image of each color of yellow (Y), magenta (M), cyan (C) and black (K), respectively. In Embodiment 1, the first to fourth image forming units SY, SM, SC and SK are disposed linearly along an intermediate transfer belt 31. The image forming unit S includes a primary transfer roller 32 and a process cartridge 7.

In Embodiment 1, the configuration and operation of the first to fourth image forming units are virtually the same, except for the color of the image to be formed. Hence unless a distinction is necessary, the subscripts Y, M C and K attached to the reference sign, to indicate the color which the element is used for, will be omitted, and [the configuration and operation] will be described in general.

In Embodiment 1, as a plurality of image bearing members, the image forming apparatus 100 includes four (4) photosensitive drums 1 which are disposed along an intermediate transfer belt 31. FIG. 2 is a schematic cross-sectional view of a process cartridge 7 in the longitudinal direction (rotation axis direction) of the photosensitive drum 1. The four (4) photosensitive drums 1 have the same configuration. FIG. 3 is a block diagram indicating the control blocks of the image forming apparatus 100.

Figure 2:
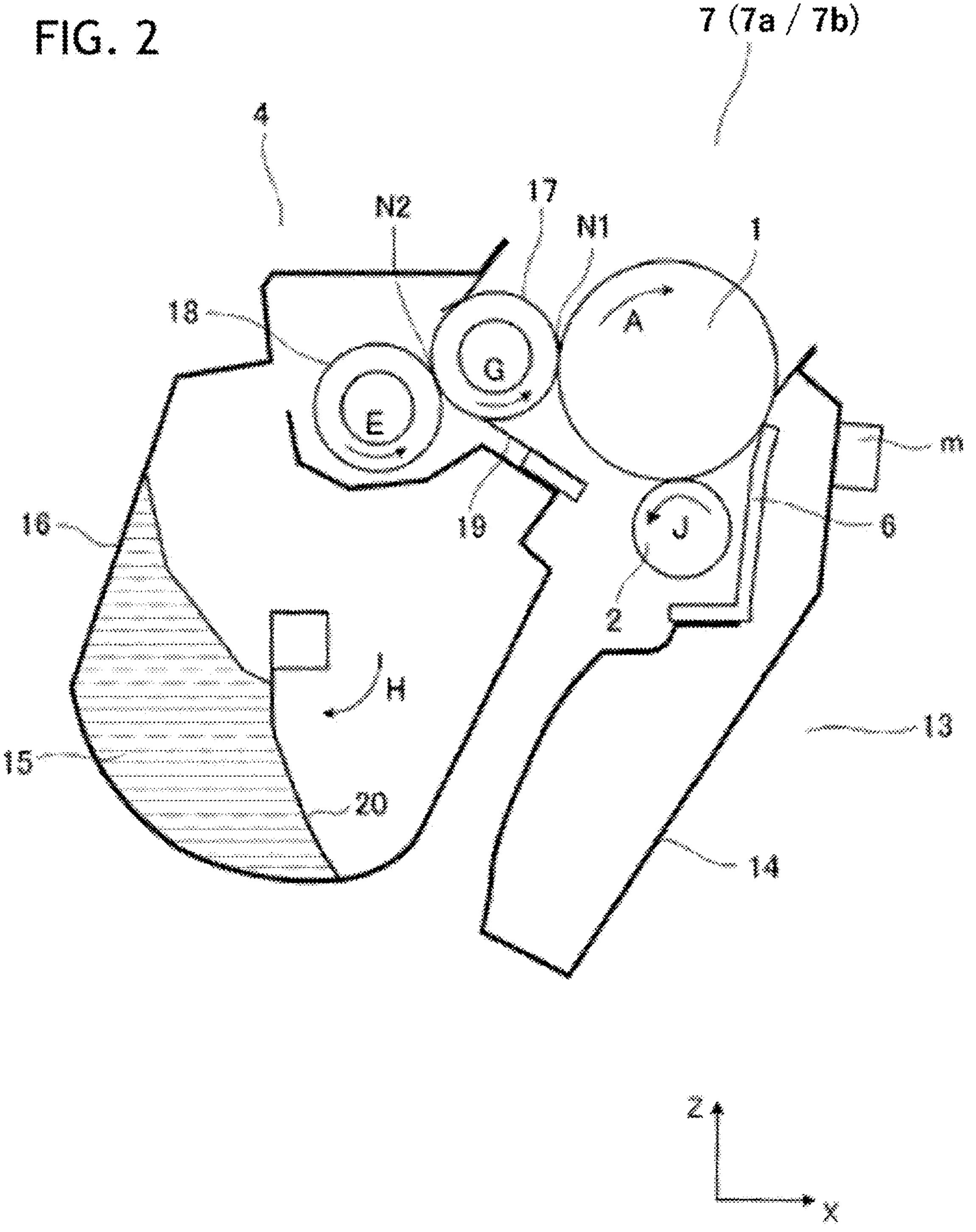
FIG. 2 is a schematic cross-sectional view depicting a configuration of a developing apparatus and a process cartridge according to Embodiment 1.

The photosensitive drum 1 is rotary-driven by a driving source 140 (driving unit) in the arrow A direction (counter-clockwise in FIGS. 1 and 2). A charging roller 2 (charging member), which is charging unit for uniformly charging the surface of the photosensitive drum 1 while rotating in the arrow J direction, is disposed around the photosensitive drum 1. The charging roller 2 may be rotated by the rotation of the photosensitive drum 1, or may be rotated driven by the driving source 140. A developing roller 17 and a cleaning blade 6 are disposed around the photosensitive drum 1. The developing roller 17 is developing unit for developing an electrostatic latent image as a toner image, and constitutes a developing unit 4 (developing apparatus). The cleaning blade 6 is cleaning unit for removing toner remaining on the surface of the photosensitive drum 1 after transfer (untransferred toner). The cleaning blade 6 is in contact with the surface of the photosensitive drum 1, and this portion contacting [with the surface of the photosensitive drum 1] is called a "contact portion". The process cartridge 7 will be described in detail later. The recording material 12 is loaded in a recording material holding unit 44, is conveyed on a conveying path R by a pickup roller, and reaches a section between a secondary transfer roller 33 and a secondary transfer opposing roller 38.

In Embodiment 1, the photosensitive drum 1, a charging roller 2 (process unit that acts on the photosensitive drum 1), the developing unit 4 and the cleaning blade 6 are integrated into a cartridge, which becomes the process cartridge 7. The process cartridge 7 is removable from the image forming apparatus 100. In Embodiment 1, the process cartridge 7 for each color is identical in major composing elements. The process cartridge 7 for each color differs in that it contains toner (developer) for each color: yellow (Y), magenta (M), cyan (C) or black (K), respectively.

Process Cartridge

A general configuration of the process cartridge 7, that can be installed in the image forming apparatus 100 of Embodiment 1, will continue to be described. In Embodiment 1, the basic configuration and operation of the process cartridge 7 for each color are identical, except for the type (color) of the contained developer. The process cartridge 7 includes: a photosensitive unit 13 which includes the photosensitive drum 1 and the like, and the developing unit 4 which includes the developing roller 17 and the like.

The photosensitive unit 13 includes a cleaning frame 14, which is a frame to support various elements in the photosensitive unit 13. On the cleaning frame 14, the photosensitive drum 1 is rotatably installed via a bearing (not illustrated). When the driving force of the driving motor (driving source 140) is transferred to the photosensitive unit 13, the photosensitive drum 1 is rotary driven in the arrow A direction (clockwise direction) in accordance with the image forming operation. In Embodiment 1, the photosensitive drum 1, which is the center of the image forming process, is an organic photosensitive member, where functional films (undercoat layer, carrier generation layer, carrier transfer layer) are sequentially coated on the outer peripheral surface of an aluminum cylinder.

Further, on the photosensitive unit 13, the cleaning blade 6 and the charging roller 2 are disposed, so as to contact the peripheral surface of the photosensitive drum 1. The untransferred toner removed from the surface of the photosensitive drum 1 by the cleaning blade 6 drops due to gravity, and is stored in the cleaning frame 14.

A roller portion, made of conductive rubber, of the charging roller 2 (charging unit) press-contacts the photosensitive drum 1, and the charging roller 2 is rotated by the rotation of the photosensitive drum 1. In the charging step, predetermined DC voltage is applied to the core metal of the charging roller 2 from a charging power supply **142*d*, whereby a uniform dark area potential (Vd) is formed on the surface of the photosensitive drum 1. A spot pattern of a laser beam, which is emitted from the scanner unit 30 in accordance with the image data, exposes the photosensitive drum 1, and in the exposed portion, charges on the surface are dissipated by carriers from the carrier generation layer, and the potential drops. As a result, an electrostatic latent image, where an exposed portion has a predetermined light-area potential (Vl) and an unexposed portion has a dark-area potential (Vd), is formed on the photosensitive drum 1**.

The developing unit 4, on the other hand, includes the developing roller 17 (developer bearing member), a developing blade 19, a toner supply roller 18 (supplying unit), and a toner accommodating chamber 16. The toner accommodating chamber 16 is an accommodating chamber where toner 15 is contained. The toner 15, used in Embodiment 1, is non-magnetic, one-component, spherical toner, which is normally charged to have negative polarity, and has a 7 μm particle diameter. On the surface of the toner 15, silica particles, having a 20 nm particle diameter, have been added as external additive for toner (external additive particles).

The developing blade 19 faces and contacts the developing roller 17, controls the coat amount of the toner supplied by the toner supply roller 18, and provides changes to the developing roller 17. The developing blade 19 is a thin plate member, and generates contact pressure using the spring elasticity of the thin plate, whereby the surface of the developing blade 19 contacts with the toner 15 and the developing roller 17. When the toner 15 is charged by the tribo-electric charging generated between the developing blade 19 and the developing roller 17, the layer thickness of the toner 15 is controlled at the same time. In Embodiment 1, predetermined voltage is applied from a blade voltage power supply to the developing blade 19, so as to stabilize the toner coating.

The developing roller 17 and the photosensitive drum 1 rotate such that the respective surfaces move in the same direction at an opposing portion N1 (contact portions) (the photosensitive drum 1 moves in arrow A direction, and the developing roller 17 moves in arrow G direction). In Embodiment 1, the toner 15, which is charged to be minus polarity by the tribo-electric charging with respect to the predetermined DC voltage applied from a developing power supply **142*f* to the developing roller 17, is transferred only to the light-area potential portion, because of the potential difference, at the opposing portion N1 contacting the photosensitive drum 1**, whereby the electrostatic latent image is developed.

The toner supply roller 18 is disposed so as to form a predetermined nip portion N2 on the peripheral surface of the developing roller 17. The toner supply roller 18 rotates in the arrow E direction (counterclockwise in FIG. 2). The toner supply roller 18 of Embodiment 1 is an elastic sponge roller, where a foamed body is disposed on the outer periphery of the conductive core metal. The toner supply roller 18 and the developing roller 17 are in contact with each other with predetermined intrusion amount, and rotate to move in mutually opposite directions at the nip portion N2. Because of this rotating operation, toner is supplied to the developing roller 17 by the toner supply roller 18, and residual toner after development, which remains on the developing roller 17, is scraped off.

A toner stirring member 20 is disposed in the toner accommodating chamber 16. The toner stirring member 20 includes a sheet type member which rotates in the arrow H direction, to stir the toner 15 contained in the toner accommodating chamber 16, and conveys the toner 15 to the upper portion of the toner supply roller 18. In Embodiment 1, the outer diameters of the developing roller 17 and the toner supply roller 18 are both $20, and the intrusion amount of the toner supply roller 18 to the developing roller 17 is set to 1.5 mm. In Embodiment 1, a predetermined DC voltage, applied to the developing roller 17, is applied to the toner supply roller 18 from the developing power supply **142*f*, and toner is transferred only to the light-area potential portion at the developing unit contacting the photosensitive drum 1**, due to this potential difference, whereby the electrostatic latent image is developed.

A memory m, constituted of a non-volatile memory and the like, is disposed in the process cartridge 7. The memory m stores information on gradation and a number of toner patches to perform image density control. This information is related to the amount of developer which a controller 72 uses to perform adjustment operation for the image density control. The information on the gradation and a number of toner patches to perform image density control here is, for example: at least one of nominal service life, toner filling amount, and roughness and hardness of the charging roller 2; at least one of information on the layer structure of the charging roller 2, and roughness and hardness of the developing roller 17; at least one of the material of the surface layer of the photosensitive drum 1, film thickness, and susceptibility to photograph deterioration; or the like. The predetermined gradation and a number of toner patches for calibration that are set for this cartridge may be stored.

The memory m is configured to be communicable with the controller 72 (control unit) of the image forming apparatus 100 illustrated in FIG. 1 without contact, or in contact via an electric contact. In other words, the controller 72 can read information from the memory m, and write information to the memory m. In FIG. 2, the memory m is installed in the photosensitive unit 13, but may be installed in the developing unit 4. Further, the memory m may be installed in both the photosensitive unit 13 and the developing unit 4. In this case, information on the photosensitive drum 1 and the charging roller 2 is stored in the memory m on the photosensitive unit 13 side, and information on the developing roller 17 and the toner 15 is stored in the memory m on the developing unit 4 side.

In Embodiment 1, for each process cartridge 7 of each color, there are a plurality of types of cartridges of which service life settings are different. The service life of the process cartridge 7 here refers to a value indicating a period in which the cartridge can be used, and is normally set in accordance with the capacity of the toner. In the case of setting the service life using a number of print sheets, a number of printable sheets, that are fed in the case of printing a typical image using the toner contained in the process cartridge 7, may be regarded as the service life, or a numeric value providing a margin may be set as the service life. Further, the service life is typically expressed by a printable number of sheets of the recording material, but may be expressed by another unit based on the time the process cartridge 7 was used, such as the number of days or number of hours that the process cartridge 7 was used.

For the process cartridge 7, a nominal service life has been set by the manufacturer. Here it is assumed that there are 2 types: the process cartridge 7 of which service life is relatively short (10,000 sheets); and the process cartridge 7 of which service life is relative long (50,000 sheets).

Further, as illustrated in FIG. 1, the image forming apparatus 100 includes a scanner unit 30, which is exposure unit (exposing apparatus) for emitting a laser beam onto the photosensitive drum 1 based on the image information, and forming an electrostatic latent image thereby. Furthermore, the image forming apparatus 100 includes an intermediate transfer belt 31 (intermediate transfer unit) that faces the four (4) photosensitive drums 1, to transfer the toner image on each photosensitive drum 1 to the recording material 12.

As illustrated in FIG. 1, the intermediate transfer belt 31 formed by an endless belt contacts with all the photosensitive drums 1, and rotates (moves) in the arrow B direction (counterclockwise in FIG. 1). The intermediate transfer belt 31 is passed around a plurality of support members, that is, a tension roller 37, a secondary transfer opposing roller 38 (which also plays a function of driving roller), and a driven roller (not illustrated). As primary transfer unit (transfer member), four (4) primary transfer rollers 32 are arranged on the inner peripheral surface side of the intermediate transfer belt 31, so as to face each photosensitive drum 1. Then voltage, of which polarity is the opposite of the normal charging polarity of the toner, is applied from a primary transfer voltage power supply 142*a* to the primary transfer roller 32. Thereby the toner image on the photosensitive drum 1 is transferred onto the intermediate transfer belt 31.

Further, as secondary transfer unit, the secondary transfer roller 33 is disposed on the outer peripheral surface side of the intermediate transfer belt 31, so as to face the secondary transfer opposing roller 38. Then voltage, of which polarity is the opposite of the normal charging polarity of the toner, is applied from a secondary transfer voltage power supply 142*b* to the secondary transfer roller 33. Thereby the toner image on the intermediate transfer belt 31 is transferred onto the recording material 12.

Figure 3:
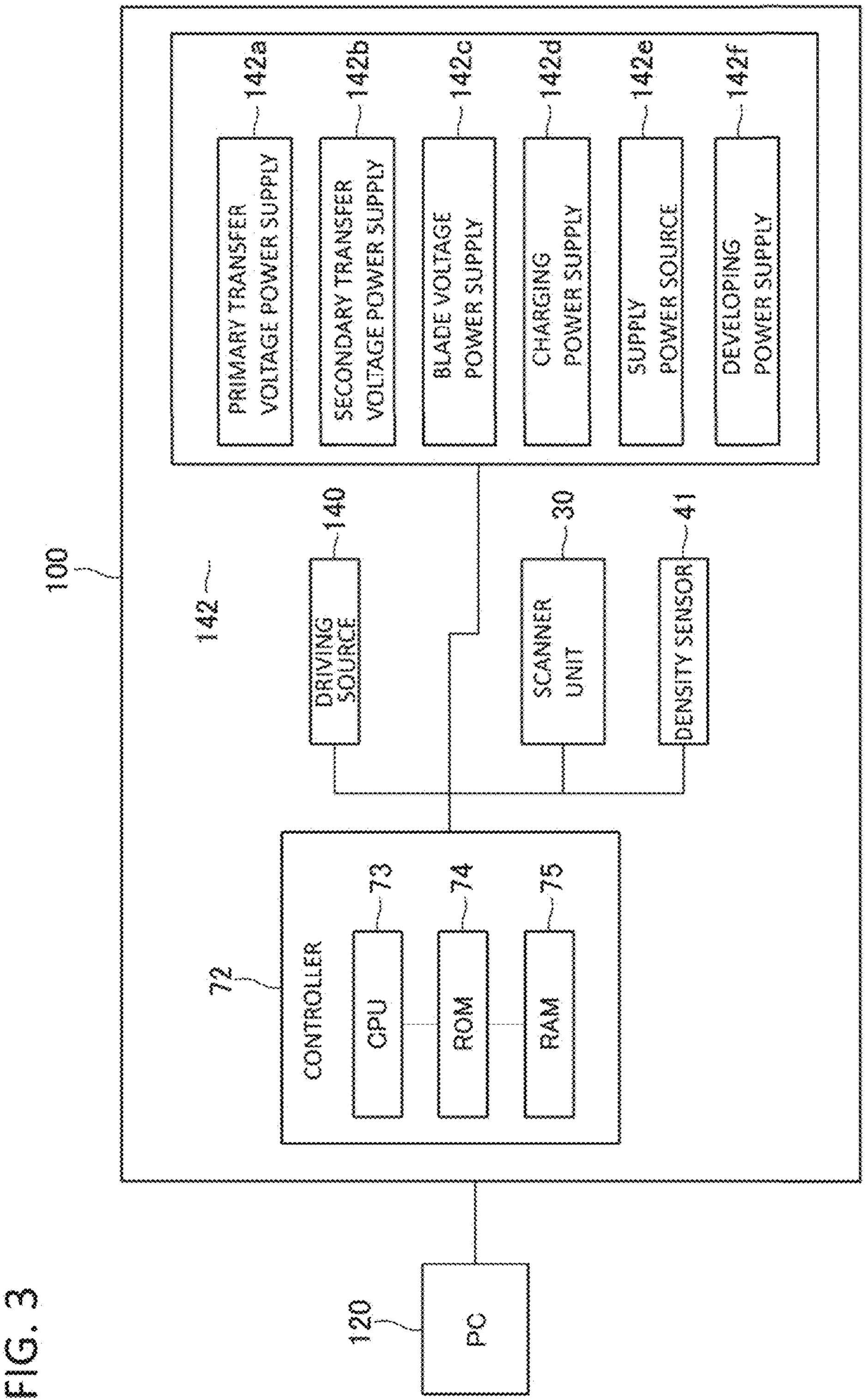
FIG. 3 is a control block diagram of the image forming apparatus according to Embodiment 1.

As indicated in FIG. 3, the image forming apparatus 100 includes a power supply 142. In accordance with the instruction of the controller 72, the power supply 142 functions as the abovementioned primary transfer voltage power supply 142*a* and secondary transfer voltage power supply 142*b*, and a blade voltage power supply 142*c*, which will be described later. In the example in FIG. 3, one power supply 142 functions as the primary transfer voltage power supply 142*a*, the secondary transfer voltage power supply 142*b*, the blade voltage power supply 142*c*, the charging power supply 142*d* which applies voltage to the charging roller 2, a supply power source 142*e* which applies voltage to the toner supply roller 18, and the developing power supply 142*f* which applies voltage to the developing roller 17. The power supply configuration, however, is not limited to this, and a different power supply may be disposed for each member. Further, a common power supply device may be used for a plurality of power supplies in accordance with the function, performance, and the like that are required. For example, a common power supply device may be used for the primary transfer voltage power supply 142*a* and the secondary transfer voltage power supply 142*b*.

When an image is formed, the surface of the photosensitive drum 1 is uniformly charged by the charging roller 2. Then an electrostatic latent image, in accordance with the image information, is formed on the photosensitive drum 1 by a laser beam emitted from a scanner unit 30 in accordance with the image information. Then the developing unit 4 supplies developer to the electrostatic latent image, whereby a toner image (developer image) is developed on the photosensitive drum. The developed toner image is then transferred to the intermediate transfer belt 31 (primary transfer) by the function of the primary transfer roller 32.

In the case of forming a full color image, for example, the abovementioned processing is sequentially performed in the first to fourth image forming units SY, SM, SC and SK, so that the toner images having each color are superimposed on the intermediate transfer belt 31, whereby the four-color toner image is formed. The four-color toner image on the intermediate transfer belt 31 is then collectively transferred onto the recording material 12 (secondary transfer). The toner image is then fixed to the recording material 12 by the fixing apparatus 34 applying heat and pressure to the recording material 12.

The primary transfer residual toner remaining on the photosensitive drum 1 after the primary transfer step is removed and collected by the cleaning blade 6. The secondary transfer residual toner remaining on the intermediate transfer belt 31 after the second transfer step is cleaned by an intermediate transfer belt cleaning device 39.

As indicated in FIG. 3, the image forming apparatus 100 includes the controller 72. The controller 72 is an information processing apparatus including such arithmetic resources as CPU 73, ROM 74 and RAM 75, and functions as a control unit that operates in accordance with programs or instructions via the touch panel of the PC 120 or the image forming apparatus main unit 110. The controller 72, for example, controls each composing element in the image forming apparatus, such as the driving source 140 (e.g., motor), the power supply 142, the scanner unit 30, and a density sensor 41.

The image forming apparatus 100 of Embodiment 1 includes the density sensor 41 (detecting unit). The density sensor 41 is an optical sensor to detect the toner amount, and is used to control the image density for calibration. The density sensor 41 is disposed facing the intermediate transfer belt 31, as illustrated in FIG. 1. The density sensor 41 measures the intensity information of the reflection light, which corresponds to the density of the toner patch formed on the surface of the intermediate transfer belt 31.

Figure 4:
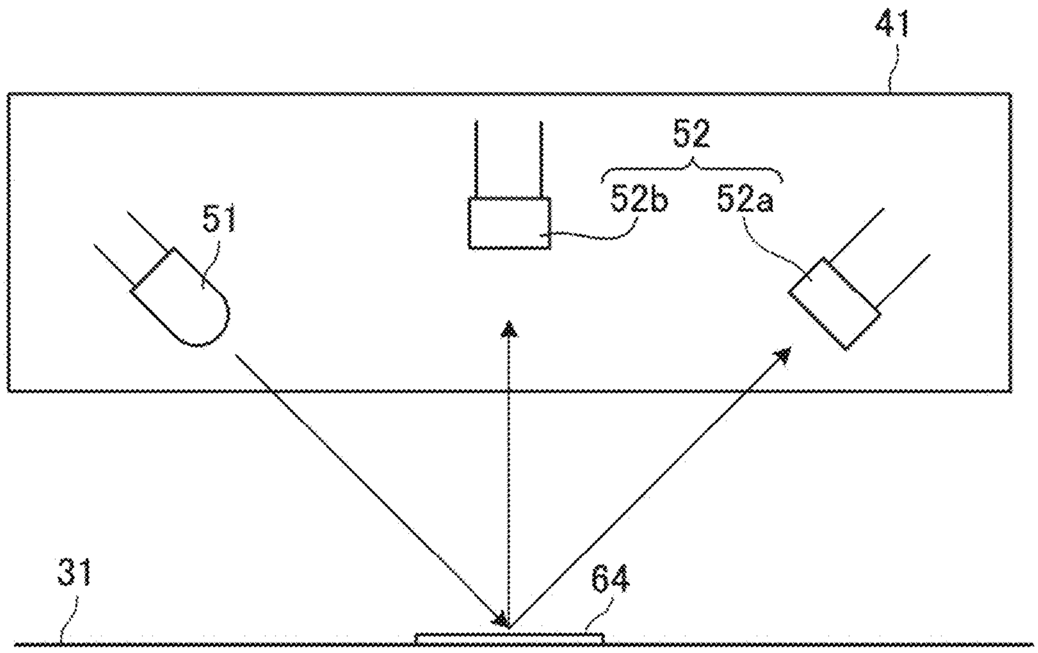
FIG. 4 is a diagram depicting a configuration of a density sensor.

FIG. 4 indicates an example of the configuration of the density sensor 41. The density sensor 41 includes a light-emitting element 51, light-receiving elements 52 (first light-receiving element 52*a* and second light-receiving element 52*b*), and a processing circuit (not illustrated), such as an IC, to process the light-receiving data, and these composing elements are housed in a holder. The density sensor 41 is configured such that information can be transmitted to/received from the controller 72. For the light-emitting element 51, an infrared light-emitting element, such as an LED, for example, can be used. For the light-receiving element 52, on the other hand, a photodiode, a CdS cell, or the like can be used.

The light-emitting element 51 emits light toward the intermediate transfer belt 31. The first light-receiving element 52*a* detects the intensity of regular reflection light from the toner patch 64, and the second light-receiving element 52*b* detects the intensity of diffused reflection light from the toner patch 64. By detecting both the regular reflection light intensity and the diffused reflection light intensity, the density of the toner patch 64 can be detected from the high density to the low density. To couple the light-emitting element 51 and the light-receiving elements 52, an optical element (not illustrated), such as a lens, may be used.

In Embodiment 1, the intermediate transfer belt 31 is a single layer resin belt formed of polyimide, of which perimeter is 880 mm. To adjust the resistance of the belt, an appropriate amount of carbon particles have been dispersed in the resin, and the surface color of the belt is black. Further, the surface of the intermediate transfer belt 31 is very smooth and glossy, and the gloss is about a 100% (measured by Gloss Meter IG-320, manufactured by Horiba Ltd.).

In a state where the surface of the intermediate transfer belt 31 is exposed (toner amount is zero), mainly the first light-receiving element 52*a* of the density sensor 41 detects the reflection light. This is because the surface of the intermediate transfer belt 31 has glossiness. In a case where a toner image is formed on the intermediate transfer belt 31, on the other hand, the regular reflection output gradually decreases as the density (toner amount) of the toner image increases. This is because the regular reflection light decreases from the surface of the belt due to the toner covering the surface of the intermediate transfer belt 31.

Figure 5:
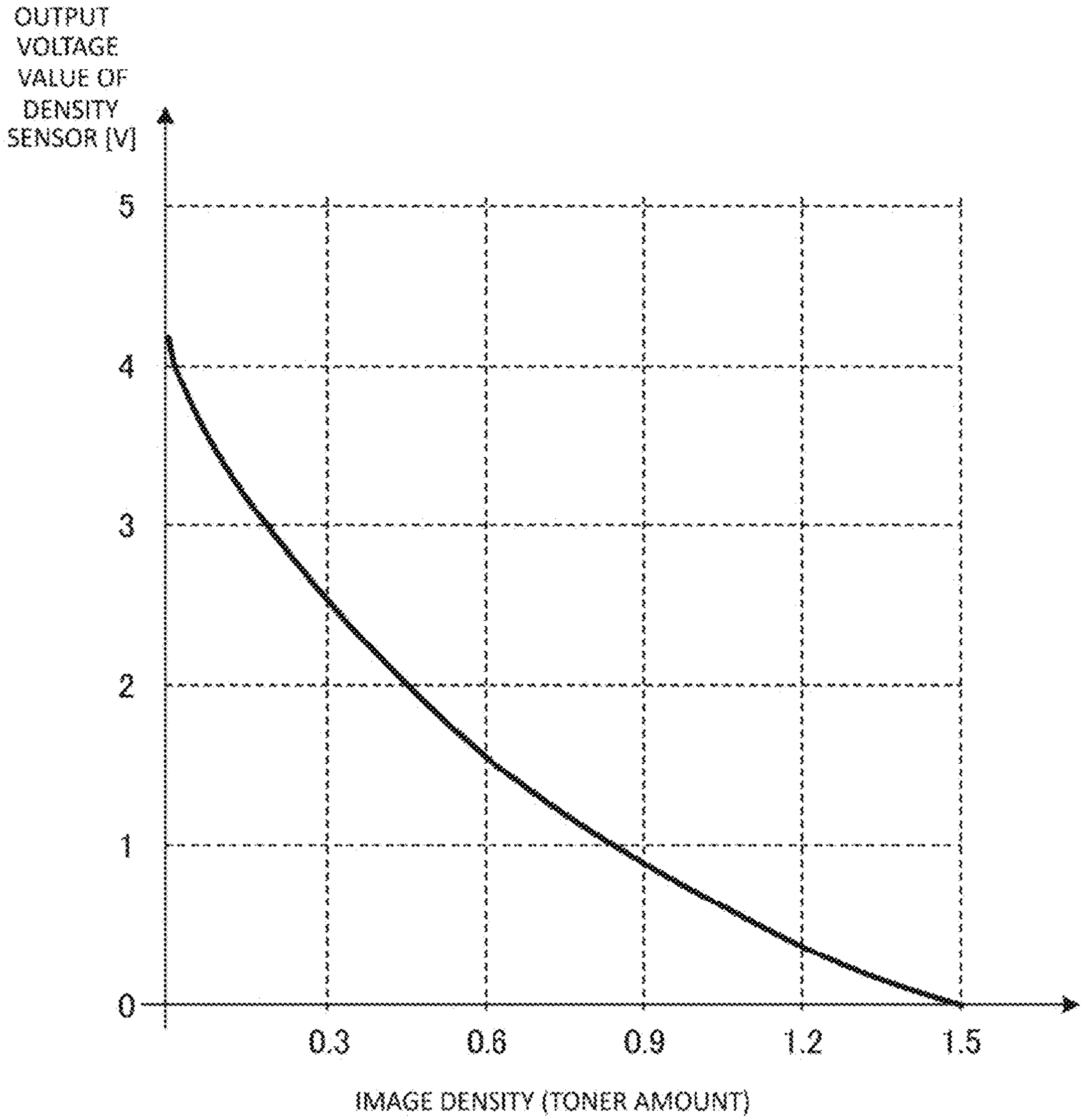
FIG. 5 is a graph for describing a density sensor characteristic.

FIG. 5 is a graph indicating a relationship between a detected value by the density sensor 41 and the toner amount. Here a detected value corresponding to the regular reflection output is indicated. In FIG. 5, the ordinate indicates the output value voltage of the density sensor 41, and the abscissa indicates the image density (corresponding to the toner amount). The maximum output value voltage of the density sensor 41 used in Embodiment 1 is 5V.

Figure 6:
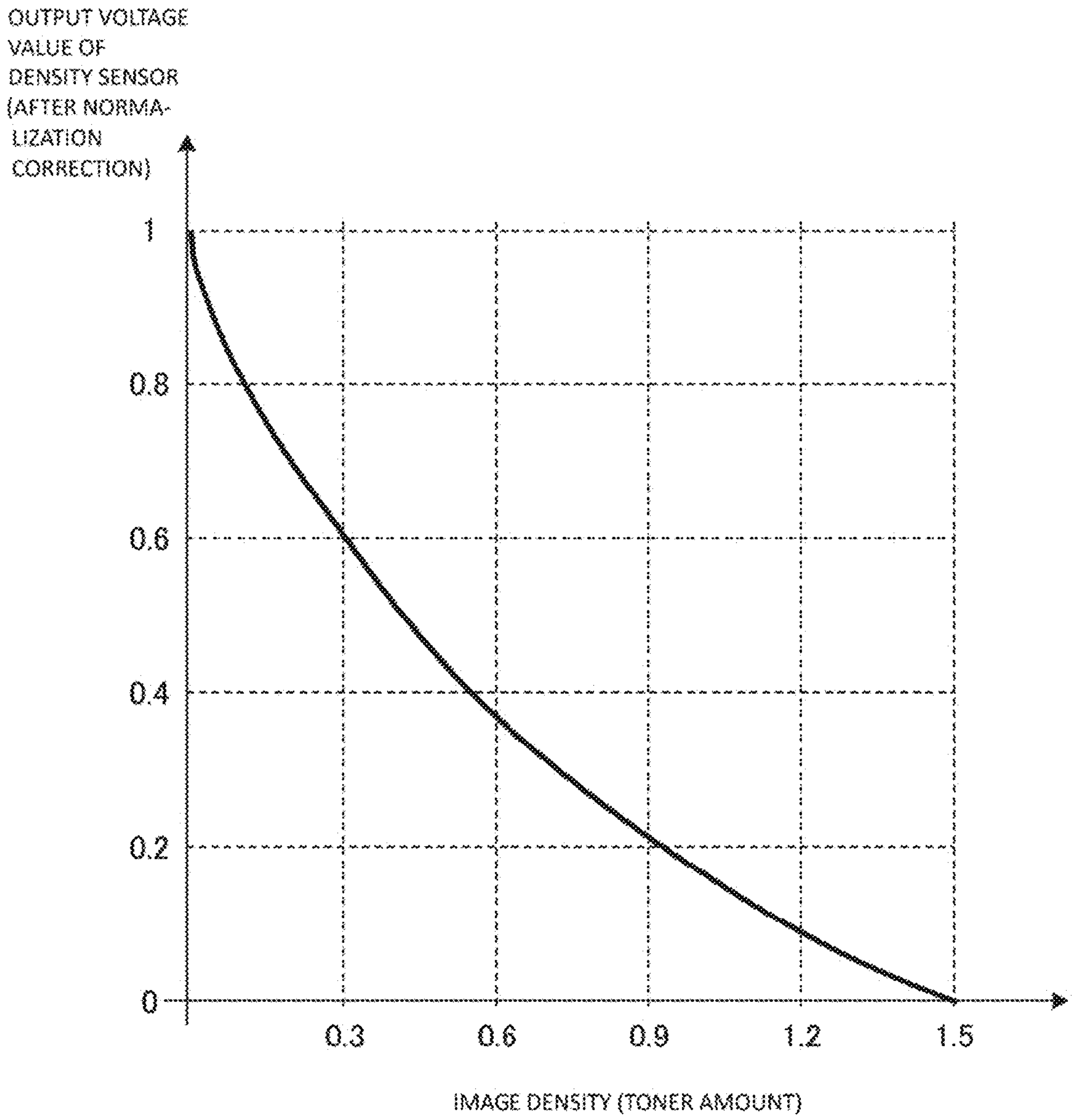
FIG. 6 is a graph for describing normalization correction of the density sensor output.

The image forming apparatus 100 of Embodiment 1 corrects the output of the density sensor 41 using the output value of the intermediate transfer belt 31 in a state where toner does not exist (background output value). Specifically, the output value of the toner patch is normalized by the background output value of the intermediate transfer member (output value when image density is zero in FIG. 5) (toner patch output/background output). FIG. 6 indicates the sensor output characteristic after normalization. By performing normalization, a same correction can be performed, even in a case where the gloss of the intermediate transfer belt 31 drops due to contamination, scratches, and the like.

The abovementioned method for correcting the output of the density sensor 41 by normalizing the toner patch output by the background output is a known method, and has been used for many color image forming apparatuses. For the density sensor 41, any conventional configuration for detecting density can be used. The wavelength of the light is not limited to infrared.

Image Density Control Operation Common to Each Embodiment

Figure 7:
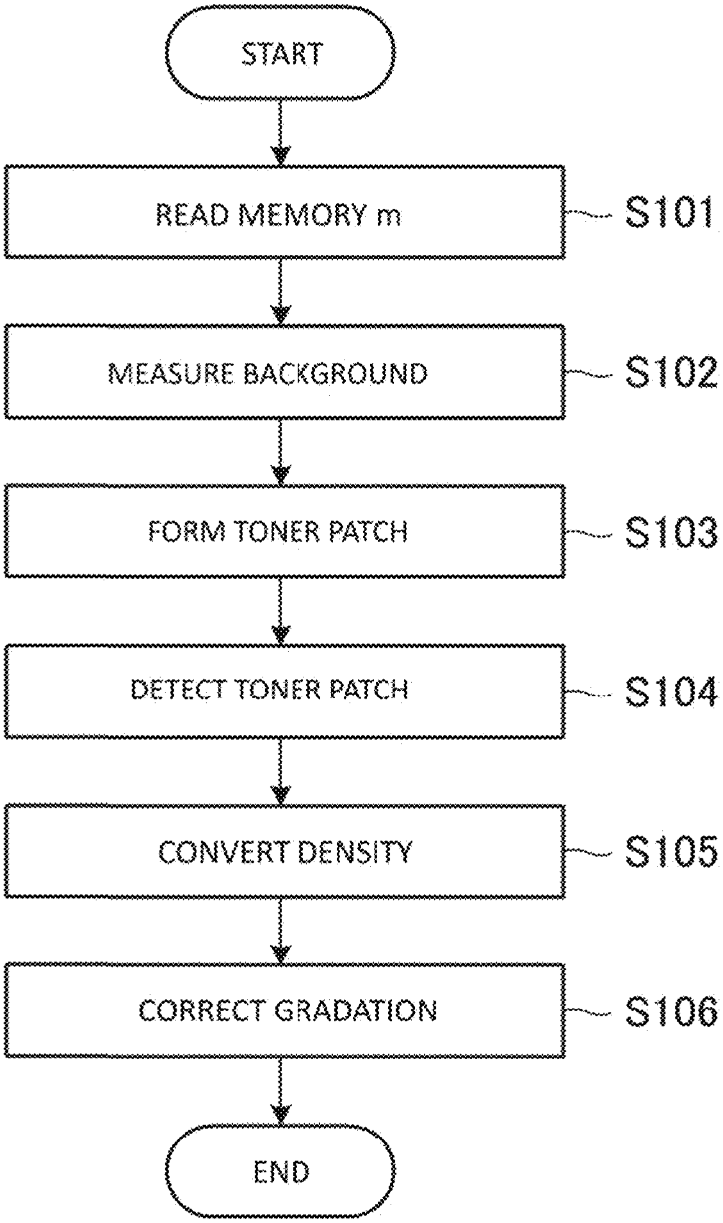
FIG. 7 is a flow chart of an image density control method.

Image density control using a toner patch in each embodiment will be described next with reference to the flow chart in FIG. 7. The image density control in the image forming apparatus 100 in the present invention is the image gradation control which adjusts the density gradation characteristic of the image. Each step of the flow is executed by the controller 72, referring to the information stored in the memory m of each process cartridge 7, the output value of the density sensor 41, and the like.

Image Density Control

The image density control can be executed at an arbitrary timing, and may be performed periodically, or performed when changes of the image density is expected. In Embodiment 1, the forming of the toner patch for this image density control is controlled appropriately, even for a plurality of different types of process cartridges 7.

First, in step S101, the controller 72 reads information stored in the memory m of each process cartridge 7. Then in step S102, the background measurement of the intermediate transfer belt 31 (that is, density measurement in the state where toner is not laid on) is executed. Here the controller 72 rotates and moves the intermediate transfer belt 31 using the driving source 140, so that a predetermined measurement position, to be the target of the density measurement on the intermediate transfer belt 31, sequentially comes within the measurement range of the density sensor 41. The measurement position and a number of points are set to be the same as the toner patch used for the image density control.

Then in step S103, the controller 72 controls the image forming unit and forms a toner patch. An example of a patch pattern formed on the intermediate transfer belt 31 will be described with reference to FIG. 8. Along the moving direction (arrow F) of the intermediate transfer belt 31, a plurality of 8 mm square patches 88 are disposed at 2 mm intervals at positions corresponding to the positions of the density sensor 41.

Figure 8:
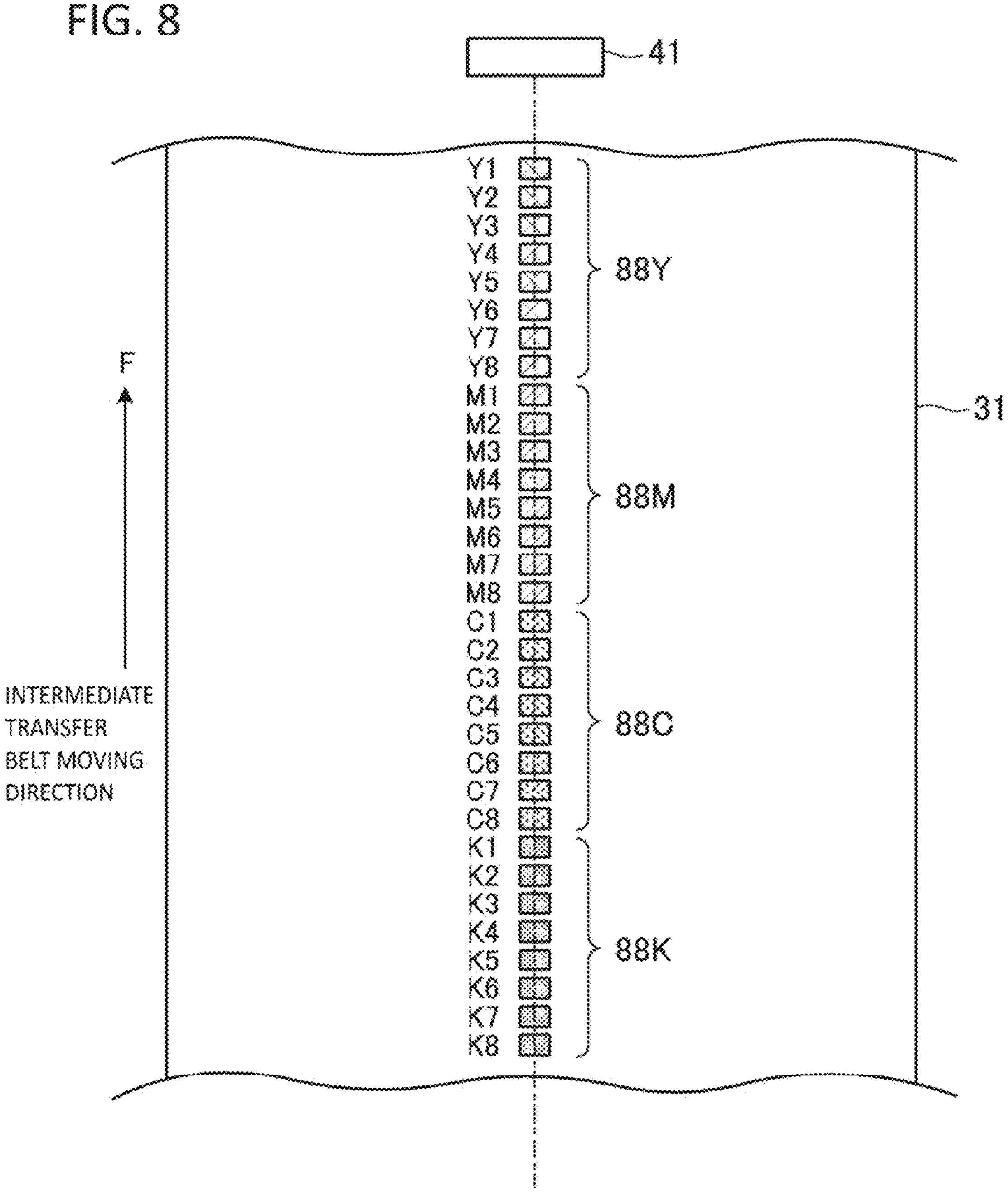
FIG. 8 is a diagram for describing a patch pattern on an intermediate transfer belt.

In Embodiment 1, a gradation and a number of patches when the image control is performed are changed based on the information stored in the memory m of each process cartridge read in step S101. The patch pattern in FIG. 8 is an example of a case of forming a highest number of toner patches in one execution of image density control in Embodiment 1. The patches 88 include yellow patches 88Y, magenta patches 88M, cyan patches 88C and black patches 88K. The patches of each color 88Y to 88K include 8 patches, respectively, of which image print ratios (density gradation) change in 8 steps (hereafter Y1 to Y8, M1 to M8, C1 to C8, and K1 to K8). As a result, a total of 32 patches 88 are formed on the intermediate transfer belt 31.

Each patch 88 and print ratio thereof are set as follows.

Y1, M1, C1, K1=12.5%
Y2, M2, C2, K2=25%
Y3, M3, C3, K3=37.5%
Y4, M4, C4, K4=50%
Y5, M5, C5, K5=62.5%
Y6, M6, C6, K6=75%
Y7, M7, C7, K7=87.5%
Y8, M8, C8, K8=100%

The background measurement of the intermediate transfer belt 31 is performed before forming the patches 88 at locations where the abovementioned 32 patches 88 are formed. For example, the background measurement may be performed one cycle before forming the patches 88. Further, each patch 88 may be printed with a single color alone, so as to execute the image density control of the single color, as described later.

Figure 9:
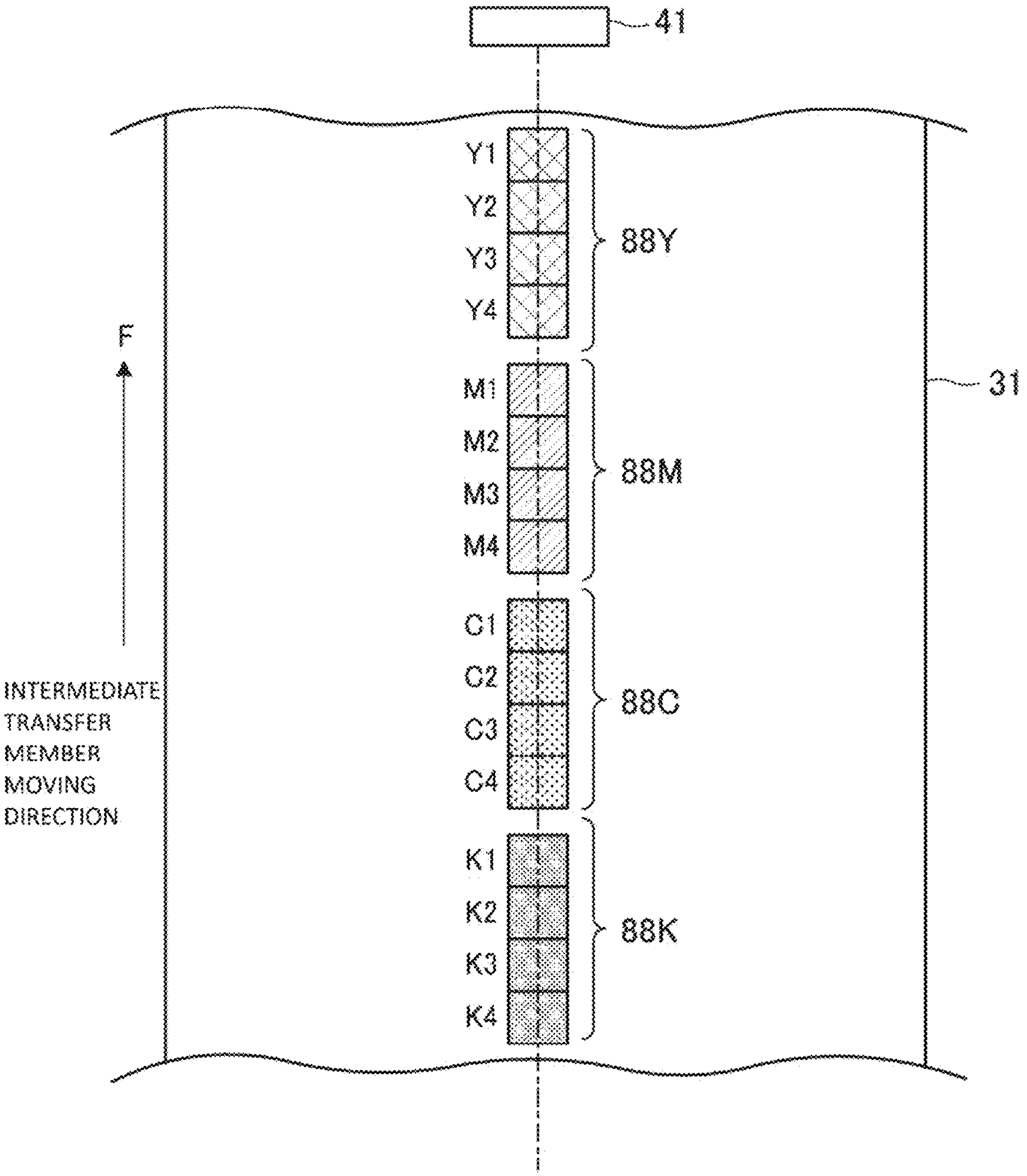
FIG. 9 is a diagram for describing another example of a patch pattern on the intermediate transfer belt.

FIG. 9 is another example of patch patterns. In this example, four (4) toner patches 88 are formed for each color. As illustrated in FIG. 9, the toner patches having a same color may be disposed continuously without intervals. For example, changing a number of image density values of toner patches from 4 to 3 in FIG. 9, out of the toner patches disposed continuously, is included in a case of changing a number of toner patches in the present invention.

The controller 72 rotates the intermediate transfer belt 31 using the driving source 140 of the image forming apparatus 100, so as to sequentially move each patch forming position to a position facing the image forming unit. Then controlling the image forming unit, the controller 72 forms the toner patches 88, as described in FIG. 8, on the intermediate transfer belt 31.

Then in step S104, the controller 72 controls the positions of the patches formed on the intermediate transfer belt 31 sequentially to come to within the measurement range of the density sensor 41, so that the density sensor 41 detects the reflection light quantity from the toner patches 88. Then in step S105, the controller 72 calculates the density of each toner patch 88. Here the output value of the toner density of each toner patch 88 is first normalized by the background output value of the intermediate transfer belt 31 (toner output/background output). This normalization of the patch output is performed for all the patches 88 using the background output value acquired at a position corresponding to each patch. Then the controller 72 converts the normalized value to a density value using a density conversion table. The density conversion table has been stored in the ROM 74 in advance.

Then in step S106, the controller 72 performs image gradation control (gradation correction). This image gradation control will be described with reference to FIG. 10. Here only the gradation correction of the cyan color will be described, but gradation is also corrected for the magenta, yellow and black colors using the same method.

Figure 10:
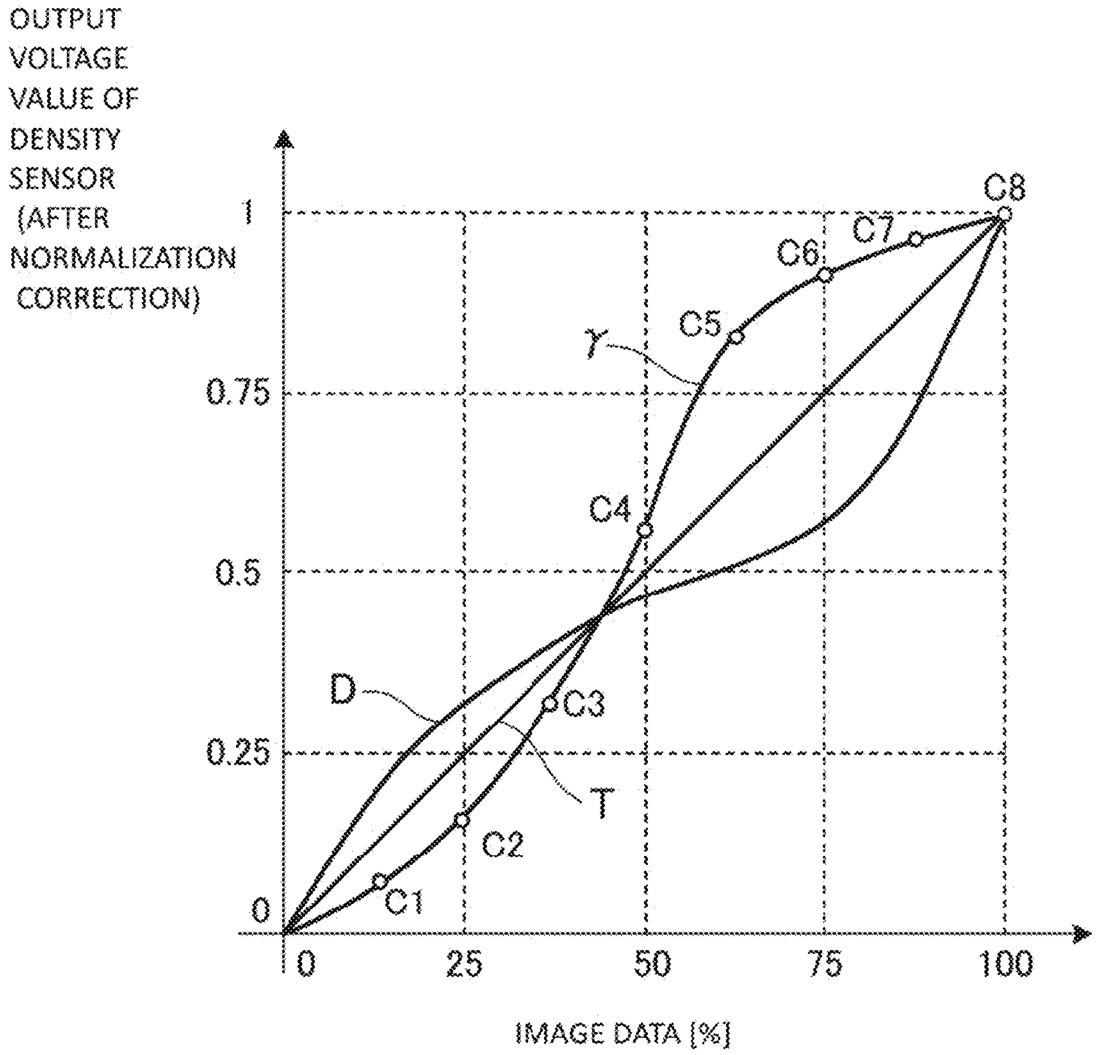
FIG. 10 is a graph for describing image gradation control.

In FIG. 10, the abscissa indicates image data (e.g., pixel value %), and the ordinate indicates the density detection value (value of output voltage after normalization correction) of the density sensor 41. The white circle symbol (circle with no coloring inside) in FIG. 10 indicates the detected density value of the density sensor 41 for each patch of C1, C2, C3, C4, C5, C6, C7 and C8. The curved line y passing through each point from C1 to C8 indicates a density gradation characteristic in a state where the density control (gradation correction control) has not been performed. For the image density at the gradation when the patches are not formed, the controller 72 calculates the value of the image data by performing spline interpolation, so that the line passes through the origin and each point C1 to C8.

A straight line T indicates a target density gradation characteristic of the image density control. In Embodiment 1, the target gradation characteristic T is determined such that the image data and the density are in proportion to each other. The gradation characteristic is not limited to a straight line. As the comparison of the curved line y and the straight line T indicates, in a case where the gradation correction is not performed in this example, the image is printed such that the image density, with respect to the image data value, becomes low in a range where the image data value is low, and the image density, with respect to the image data value, becomes high in a range where the image data value is high. In other words, an image is printed at a tinge not desired by the user.

A curved line D indicates a gradation correction table calculated in the control of Embodiment 1. The controller 72 calculates the gradation correction table D by determining the symmetric points of the pre-correction gradation characteristic y with respect to the target gradation characteristic T. The calculated gradation correction table D is stored in the RAM 75.

When a print image is formed, the controller 72 corrects the values of the image data with reference to the gradation correction table D, whereby the target gradation characteristic can be acquired. For example, in a range where the image data values are low, the image data values are corrected to be higher using the gradation correction table D. By determining a control value of the image forming apparatus 100 using these post-correction image data values, the density of the image to be printed can be increased, and the gradation characteristic can be lifted to a straight line T.

The method of the image density control used here may be any known method for controlling the image forming conditions. The image forming conditions are, for example, the spot pattern conditions of a laser beam which is emitted from the scanner unit in accordance with the image data, developing conditions (e.g., developing voltage), and charging conditions (e.g., charging voltage). The controller 72 forms patches having a plurality of predetermined patterns (e.g., half tone patterns) on the intermediate transfer belt 31, where these image forming conditions are changed in a plurality of steps, detects the densities of the patch patterns, and calculates the image forming conditions to obtain the desired density.

Figure 11:
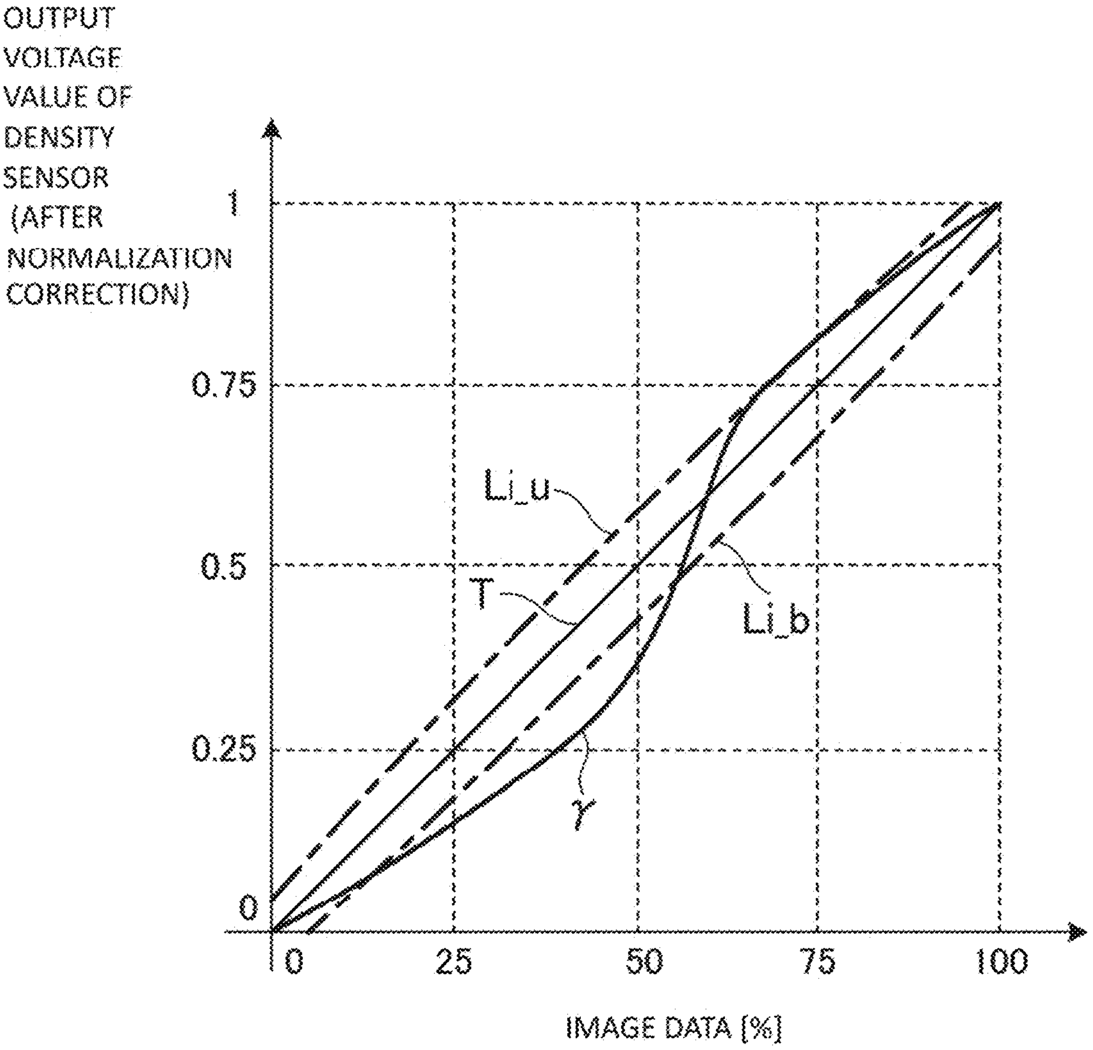
FIG. 11 is a graph for describing transition of a curve y.

Now the transition of the change of the curved line y when images are printed will be described with reference to FIG. 11. Immediately after performing the image density control according to the abovementioned flow, the relationship between the image data value and the image density forms the straight line T by the correction using the abovementioned gradation correction table D. However, as a number of printed sheets increases thereafter, deviation of the density gradation increases. In a case where the tolerance of the image density is between the curved line Li_u and the curved line Li_b, the image density control is performed at a timing when gradation on the curved line y extends outside the tolerance, and the curved line y is returned to T. Thereby the tinge reproducibility can be maintained. The above is the description on the image density control (image gradation correction) according to Embodiment 1.

Example of Adjustment Operation for Image Density Control

In Embodiment 1, there are process cartridges 7 of which service lives are different: a process cartridge of which nominal service life is 10,000 sheets (hereafter called Type 1, or first process cartridge 7*a*; a. first service life is set for the first process cartridge 7*a*); and a process cartridge of which nominal service life is 50,000 sheets (hereafter called Type 2, or second process cartridge 7*b*; a. second service life, which is longer than the first service life, is set for the second process cartridge 7*b*). In Embodiment 1, the filling amount of the toner 15 of Type 1 and that of Type 2 are different. Specifically, the filling amount of the toner 15 is greater in the cartridge of Type 2 than in the cartridge of Type 1.

Figure 12A:
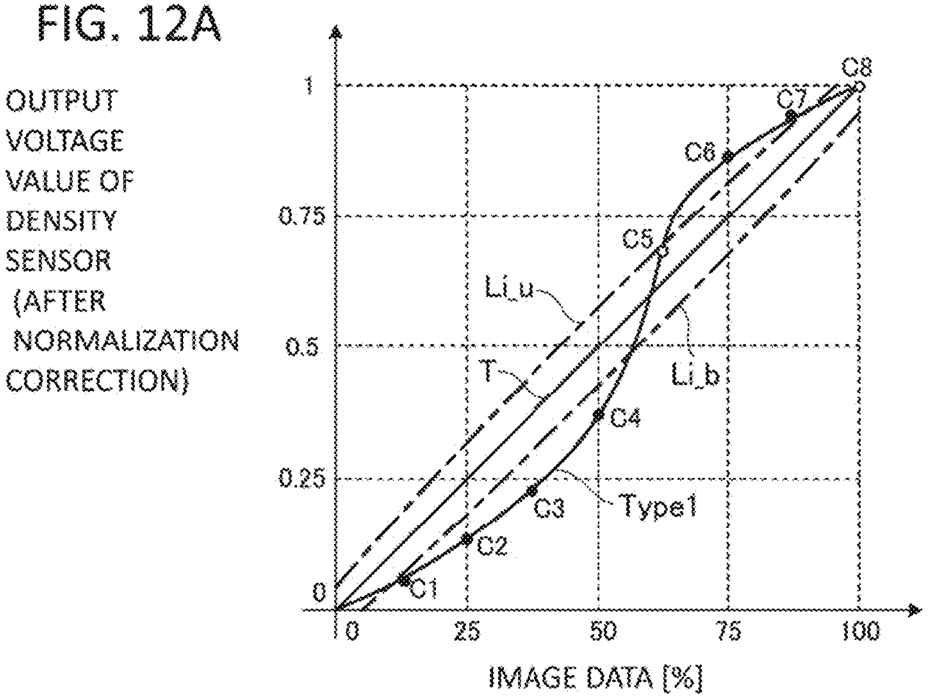
FIGS. 12A and 12B are graphs indicating each transition of density gradation of process cartridges having different service lives.
Figure 12B:
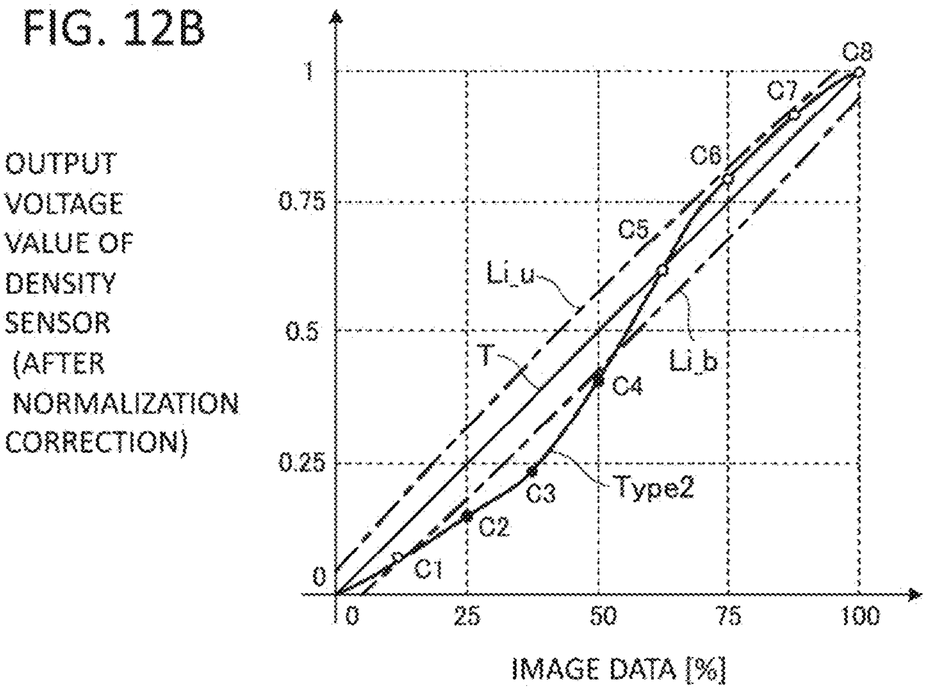

In a predetermined temperature/humidity environment, the image forming apparatus of Embodiment 1 executes the image density control every 1,000 sheets, so as to maintain the tinge reproducibility. FIG. 12 and Table 1 indicate the results of the Type 1 and Type 2 process cartridges having different service lives when the density states of the toner patches C1 to C8 for the image density control, with respect to the curved line Li_u and the curved line Li_b (tolerance), were observed at a timing just when the predetermined number of sheets (1,000 sheets) was exceeded. FIG. 12A indicates the result of the Type 1 process cartridge, and FIG. 12B indicates the result of the Type 2 process cartridge, and a toner patch which exceeded the tolerance is indicated by a black dot (black colored circle).

TABLE 1

| Process cartridge | Type 1 | Type 2 |
|---|---|---|
| Toner patches outside the range between the curved lines Li_u and Li_b | C1, C2, C3, C4, C6, C7 | C2, C3, C4 |

As FIG. 12 and Table 1 indicate, in the Type 1 process cartridge having a short service life, a wide range of toner patches exceeded the tolerance, but in the Type 2 process cartridge having a long service life, only C2, C3 and C4 having intermediate tone, where density gradation easily changes, exceeded the tolerance. These results are probably because the mixing ratio of old toner with new toner in the developing unit is high in the process cartridge having a short service life, but is limited in the process cartridge having a long service life, where toner is fully supplied from the developer container.

Based on these results, in the image forming apparatus of Embodiment 1, as indicated in Table 2, the gradation and a number of toner patches for the image density control, which are set in advance for each of Type 1 and Type 2 process cartridges, are saved in the memory m of the process cartridge, respectively. In this case, information corresponding to the amount of developer contained in the accommodating chamber is stored in the memory m. For example, if the amount of developer contained in the Type 1 cartridge is a first amount, and the amount of developer contained in the Type 2 cartridge is a second amount, first information, that the amount of the developer is the first amount, is stored in the memory of the Type 1 cartridge. In the same manner, second information, that the amount of developer is the second amount, is stored in the memory of the Type 2 cartridge. Here only two types of information are used to simplify description, but various information can be used in accordance with the amount of developer that can be contained.

TABLE 2

| Memory m | Type 1 | Type 2 |
|---|---|---|
| Gradation of toner patch | ALL | C2, C3, C4 |
| Number of toner parches | 8 | 3 |

In the example of Table 2, all the toner patches are formed in the Type 1 process cartridge to simplify description, but C5 and C8 may be removed therefrom. In the above example, the gradation and a number of toner patches are stored in the memory m, but the present invention is not limited to this. For example, a variable for each type of process cartridge may be stored in the memory m, and such information as Table 2 may be obtained by performing calculations referring to mathematical expressions and coefficient held by the controller 72. Further, referring to the filling amount and the service life stored in the memory m, the controller 72 may perform control to simply decrease a number of toner patches in a case where the filling amount is high (service life is long).

As described above, in Embodiment 1, the adjustment operation of the image density control is optimized using the characteristics of the gradation change generated by predetermined specifications of the process cartridges, which service lives are different (toner filling amounts are different). In other words, by using a nominal service life (that is, the toner filling amount) as the information related to the gradation and a number of toner patches, the image density control can be adjusted with less toner patches in the Type 2 process cartridge having a longer service life, compared with the Type 1 process cartridge.

In the present invention, it is sufficient if the toner amount used for the image density control can be changed by controlling the calibration pattern in accordance with the toner filling amount and the service life, whereby the operation can be optimized. As long as such calibration pattern control is possible, a method other than controlling a number of toner patches may be used. For example, the toner amount may be adjusted by decreasing the surface area of each toner patch if the filling amount is high. For example, if the toner patch is rectangular, the width of the toner patch may be decreased, or the length thereof may be decreased (intervals of the toner patches may be increased) to decrease the surface area of the toner patch. If the toner patch is a shape other than a rectangle, the size of the toner patch may be reduced in accordance with the shape.

Further, in a case where it is determined that the process cartridge is a large capacity cartridge, the accuracy of the image density control may be improved while maintaining a number of toner patches, without decreasing the number. For example, in the case of using 8 toner patches, as indicated in Table 2, for the large capacity (Type 2) process cartridge, the block of C2, C3 and C4 is divided into 8 so as to create 8 toner patches, and the image density control is performed thereby. In this example, the block of C2 to C4 may be divided by a number less than 8 (e.g., 5) to create a lower number of toner patches. Then, in the block where the image density control is required, accuracy improves but a number of toner patches can be reduced.

For both Type 1 and Type 2, the gradation of the toner patch may be set to ALL, but the division numbers may be changed while maintaining the same gradation, such as 8 division for Type 1 and 7 division for Type 2.

The image forming apparatus of Embodiment 1 is not limited to the content described above. For example, the tip position of the developing blade in each process cartridge, the sensitivity of the drum included in each process cartridge, and the like may be written in the memory m during manufacture, so that the conditions of the toner patches are changed in accordance with the change of gradation characteristics generated by these values. Further, the conditions of the toner patches may be changed based on the information on the parameters related to toner. For example, generally as the intruding amount of the tip position of the blade is higher, the amount of toner taken in by the developing roller increases, and the toner charging amount decreases. Therefore, even a small amount of electrostatic latent images can be more easily developed, and gradation generally becomes darker. The image density control may be adjusted recognizing this. Another example is that the amount of change of surface potential increases as the drum sensitivity becomes higher, hence gradation generally becomes darker even if the quantity of light is the same during exposure. There are various other factors, besides service life, that influence the characteristics of the gradation change. Considering these factors, the gradation and a number of tone patches may be determined.

In Embodiment 1, the method of optimizing the adjustment operation for the image density control, based on the information in the memory which saves information related to the developer amount used for an adjustment operation for the image density control, included in each process cartridge, was described. Thereby the toner amount to be consumed for one execution of density control can be suppressed while maintaining quality. As a result, a number of printable sheets can be increased even if the toner filling amount in the process cartridge is the same, or a process cartridge that is light and easy to handle can be provided.

Embodiment 2

Embodiment 2 will be described next. Description on portions overlapping with Embodiment 1 will be omitted. In Embodiment 2, even if the image forming apparatus is used in a wider range than Embodiment 1, the toner amount consumed in one execution of the image density control can be suppressed while maintaining quality.

In Embodiment 1, the adjustment operation for the image density control is optimized based on the predetermined specifications or information determined during manufacturing, using the characteristics of gradation changes of the process cartridges of which service lives are different (toner filling amounts are different). In Embodiment 2, on the other hand, the adjustment operation for the image density control is optimized also using the information on the operation history of the image forming apparatus, which is different from Embodiment 1. In Embodiment 2 as well, Type 1 and Type 2 process cartridges having different service lives will be used for description, just like Embodiment 1.

Figure 13:
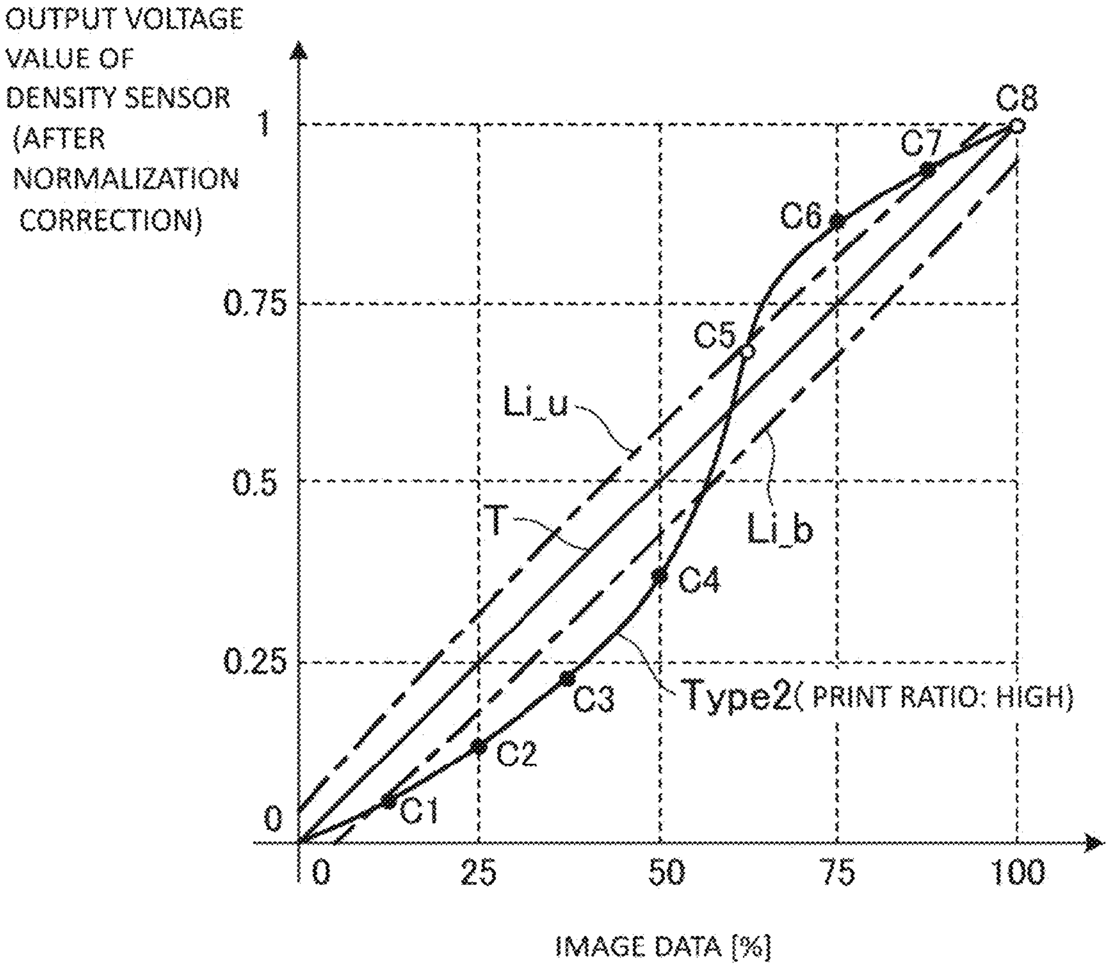
FIG. 13 is a graph indicating a transition example of density gradation according to Embodiment 2.

FIG. 13 indicates the result of the Type 2 process cartridge when the density states of the toner patches C1 to C8 for the image density control, with respect to the curved line Li_u and the curved line Li_b (tolerance), were observed at a timing just when the predetermined number of sheets (1,000 sheets) was exceeded, in the same manner as Embodiment 1. The paper feeding condition of Embodiment 2 that is different from Embodiment 1 here is that the toner consumption amount, when 1,000 sheets were fed, is higher. In other words, in Embodiment 2, the print ratio when a sheet is fed is higher than Embodiment 1. The print ratio here refers to a ratio of a region where the developer image is formed, with respect to a region of the recording material 12 where an image can be formed. For example, a black solid image is print ratio 100%, and a white image is print ratio 0%.

Compared with FIG. 12A and FIG. 12B, FIG. 13 is similar to FIG. 12A, which is the result of a Type 1 process cartridge having a short service life. This is because even in the case of a process cartridge having a long service life, the mixing ratio of the old toner with new toner at the developing unit become high (equivalent to the case of the process cartridge having a short service life) if the toner consumption amount is high during printing, and the density gradation changes in a wider gradation range thereby.

Hence in Embodiment 2, the gradation change characteristics, including the toner consumption amount, are detected and saved in the memory m in advance. Then the adjustment operation for the image density control is optimized, additionally using the information related to the consumption amount of the developer (e.g., print ratio, history thereof), which is written in the memory m each time printing is performed.

The controller 72 of Embodiment 2 calculates the print ratio based on the image data for each paper feed, and changes the gradation and a number of toner patches in accordance with the average print ratio at a timing of the image density control (e.g., when 1,000 sheets are fed). For example, if the average print ratio is a predetermined threshold or more, a number of toner patches is set to 8, just like the case of FIG. 12A (case of Type 1), even if a Type 2 process cartridge having a long service life is used. A number of types of patch patterns is not limited to 2, and a number of toner patches may be changed in steps in accordance with the print ratio.

Further, in Embodiment 2, the control may be performed using an integrated value of consumed toner amount, instead of the print ratio. In this case, the controller 72 calculates the consumed toner amount based on the image data, and integrates the value each time a sheet is fed. Then, at a timing of the image density control (e.g., when 1,000 sheets are fed), the patch pattern is selected so that a number of toner patches increases as the integrated value of the consumed toner amount is higher.

The image forming apparatus of Embodiment 2 is not limited to the above example, and parameters related to deterioration of toner, such as rotation time, rotation frequency and surface moving distance of the developing roller 17, may be used. The controller 72 can determine a number and gradation of the toner patches used for the image density control based on the predetermined program in accordance with these parameters. The patch pattern is selected such that a number of toner patches increases as the rotation time of the developing roller 17 is longer, the rotation frequency thereof is higher, or the surface moving distance thereof is longer.

As the service life of the process cartridge approaches expiration, the parameters may be set to change the gradation and a number of toner patches to be used. Specifically, even in a case of the Type 2 process cartridge having a long service life, all the toner patches C1 to C8 are formed in the beginning of use (until the remaining service life reaches a predetermined value), and only toner patches C2 to C4 are used to perform the image density control after the remaining service life becomes a predetermined % or less (20% or less in Embodiment 2), as indicated in Table 3. This is because the toner circulation in the developer chamber is not in a sufficient state for a while after a new product starts to be used (until the remaining service life becomes a predetermined %), where small diameter and highly charged toner tends to be selectively developed and transferred, and the gradation characteristics may not be stable.

TABLE 3

| Memory m | Type 2 (new product to remaining service life: predetermined %) | Type 2 (remaining service life: predetermined % or more) |
|---|---|---|
| Gradation of toner patch | ALL | C2, C3, C4 |
| Number of toner patches | 8 | 3 |

Further, the image density control may be performed using all the toner patches C1 to C8 once every predetermined number of times of image density control, which is performed at predetermined page intervals.

Embodiment 3

Embodiment 3 of the present invention will be described next. Description of portions overlapping with Embodiments 1 and 2 will be omitted. In Embodiment 3, the image density control method is different from Embodiments 1 and 2.

In Embodiments 1 and 2, toner patches are formed on the intermediate transfer belt 31, and the image density and gradation are adjusted based on the result of measuring the toner patches using the density sensor 41. The controller 72 of Embodiment 3, on the other hand, obtains calculation parameters for the image density control, which are stored in the ROM 74 of the image forming apparatus 100 in advance, the parameters stored in the memory m of each process cartridge, and adjusts the image density and gradation by calculation as prediction control, using these calculation parameters, without using the detection result of the toner patches.

Specifically, the controller 72 refers to information to determine whether the image density control (prediction control) can be performed by the calculation of parameters stored in the memory m of each process cartridge in advance. If the controller 72 determines that the image density control based on the calculation is effective, subsequent image density control is switched to the image density control by calculation. The controller 72 calculates the image density at each point, using the parameters on the process cartridges related to the member information (types of charging roller and developing roller, drum sensitivity) and service life of the cartridge recorded in the memory m, and the temperature/humidity information, a number of print sheets, toner amount in the cartridge, and the like, which the controller 72 obtains from the image forming apparatus.

The density calculation program, which is stored in the ROM 74, has been determined in advance by performing machine learning using the abovementioned parameters. By executing the image density control using these calculation parameters, the image density control can be completed only within the calculation processing time, without a series of operation times required for forming patches on the intermediate transfer belt, measurement by the density sensor, and the like. Hence control frequency can be increased, whereby tinge reproducibility can be improved to a level equivalent to or even exceeding the image density control based on the toner patch detection.

As described above, the image density control has been performed by a same method regardless the type of process cartridge, hence in some cases, more toner patches are formed than necessary. According to the present invention, however, the adjustment operation for the image density control can be optimized based on the information related to the developer amount used for the adjustment operation for the image density control, which is stored in the memory m of each process cartridge. Therefore, the toner amount to be consumed for each density control process can be suppressed while maintaining quality, without updating the apparatus control software of the image forming apparatus. As a result, a number of printable sheets can be increased even if the toner filling amount in the process cartridge is the same, and a process cartridge that is light and easy to handle can be provided. In each of the above embodiments, four (4) process cartridges are used, but a number of process cartridges is not limited to this, and may be one (1) or a number other than four (4).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-214787, filed on Dec. 20, 2023, which is hereby incorporated by reference herein in its entirety.

What is claimed is:

1. An image forming apparatus to which a process cartridge is attachable, wherein the process cartridge is configured to include: an image bearing member of which surface is exposed based on image data to form an electrostatic latent image on the surface; a developer bearing member which develops the electrostatic latent image by developer to form a developer image; an accommodating chamber which contains the developer; and a memory, wherein the image forming apparatus comprises:

a detecting unit configured to emit light to a patch of the developer image, detect reflected light, and output information on the reflected light, and a control unit configured to perform image density control on the process cartridge, to control image density when forming the developer image, based on a value of the image data and information related to the reflected light, wherein the memory stores information corresponding to a developer amount contained in the accommodating chamber, and wherein the control unit controls to change a pattern of the patch to be used for the image density control, between a case where the information in the memory is first information corresponding to a case of the developer amount being a first amount, and a case where the information is second information corresponding to a case of the developer amount being a second amount, which is different from the first amount.

2. The image forming apparatus according to claim 1, wherein the control unit controls to refer to the memory, and changes the pattern of the patch such that as an amount of the developer contained in the accommodating chamber is higher, an amount of the developer to be used for forming the patch in the image density control is lower.

3. The image forming apparatus according to claim 2, wherein the control unit controls to change the pattern of the patch such that as the amount of the developer contained in the accommodating chamber is higher, the number of patches is lower.

4. The image forming apparatus according to claim 2, wherein the control unit controls to change the pattern of the patch such that as the amount of the developer contained in the accommodating chamber is higher, a size of the patch is smaller.

5. The image forming apparatus according to claim 1, wherein the memory stores, as the information corresponding to the developer amount, an amount of the developer contained in the accommodating chamber, which has been determined as a specification of the process cartridge, or which has been determined at a time of manufacturing the process cartridge.

6. The image forming apparatus according to claim 1, wherein the memory stores, as the information corresponding to the developer amount, a service life of the process cartridge.

7. The image forming apparatus according to claim 6, wherein the service life of the process cartridge refers to the number of sheets of recording material on which an image is formable by using the process cartridge.

8. The image forming apparatus according to claim 1, wherein the control unit controls to change a pattern of the patch in the image density control, based on information on history of forming images on recording material by the image forming apparatus.

9. The image forming apparatus according to claim 8, wherein the control unit controls to change the pattern of the patch such that as an average print ratio of a predetermined number of sheets of the recording material, on which images are formed by the image forming apparatus, is higher, the amount of the developer to be used for forming the patch in the image density control is higher.

10. The image forming apparatus according to claim 8, wherein the control unit controls to change the pattern of the patch such that as the amount of the developer consumed while the images are formed on a predetermined number of sheets of the recording material by the image forming apparatus is higher, the amount of the developer to be used for forming the patch in the image density control is higher.

11. The image forming apparatus according to claim 1, wherein the memory stores, as the information corresponding to the developer amount used for an adjustment operation for the image density control, information on whether the adjustment operation for the image density control is changed to prediction control.

12. The image forming apparatus according to claim 1, wherein the control unit controls to obtain gradation characteristics for forming the developer image, based on the value of the image data and image density acquired by an adjustment operation for the image density control, and performs the image density control such that the gradation characteristics become target gradation characteristics.

13. The image forming apparatus according to claim 1, wherein in the image forming apparatus, a plurality of the process cartridges are attachable simultaneously, and the control unit controls to change content of an adjustment operation for the image density control for each of the plurality of process cartridges.

14. The image forming apparatus according to claim 1, further comprising an intermediate transfer member onto which the developer image formed by the process cartridge is transferred, wherein the pattern of the patch is formed on the intermediate transfer member.

* * * * *